United States Patent [19]
Goletto

[11] 3,945,968
[45] Mar. 23, 1976

[54] HEAT-RESISTANT POLYURETHANE COMPOSITIONS

[75] Inventor: Jean Goletto, Villeurbanne (Rhone), France

[73] Assignee: Rhone-Poulenc Textile, Paris, France

[22] Filed: Sept. 12, 1974

[21] Appl. No.: 505,604

[30] Foreign Application Priority Data
Sept. 17, 1973  France ............................... 73.33243
July 5, 1974  France ............................... 74.23441

[52] U.S. Cl. ..................... 260/45.95 R; 260/2.5 BB
[51] Int. Cl.² ............................................ C08J 3/20
[58] Field of Search ................. 260/45.95 R, 2.5 BB

[56] References Cited
UNITED STATES PATENTS

| | | | |
|---|---|---|---|
| 2,915,496 | 12/1959 | Swart et al. ...................... | 260/45.95 |
| 3,265,660 | 8/1966 | Burgess et al. .................... | 260/45.95 |
| 3,386,942 | 6/1968 | Bell et al. ......................... | 260/45.95 |

*Primary Examiner*—V. P. Hoke
*Attorney, Agent, or Firm*—Cushman, Darby & Cushman

[57] ABSTRACT

Polyurethanes are rendered resistant to heat and oxidation by addition, as stabiliser, of a hydroxylic spiro-bis-indane of the formula:

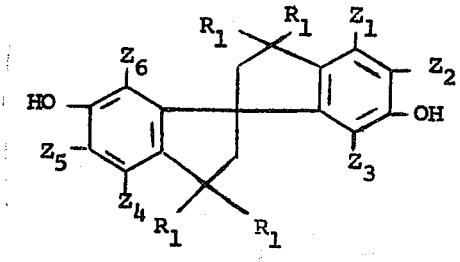

in which each of the $R_1$ radicals which may be identical or different; represents a methyl or ethyl radical, and each of $Z_1$, $Z_2$, $Z_3$, $Z_4$, $Z_5$ and $Z_6$, which may be identical or different, represents a hydrogen atom, a hydroxyl group an alkyl radical, an alkoxy radical or a halogen atom.

11 Claims, No Drawings

HEAT-RESISTANT POLYURETHANE COMPOSITIONS

The present invention relates to a process for rendering polyurethanes heat-resistant and resistant to oxidation.

It is known that it is important to introduce stabilisers into various plastics materials in order to retain their mechanical properties and/or their appearance during use. The nature of these stabilisers varies depending on the chemical constitution of the plastics material and on the type of agent which induces ageing or deterioration, for example heat, ultra-violet light or combustion.

Thus, it has been proposed to render polyurethanes resistant to heat by means of blocked polyphenols such as the compound of the formula:

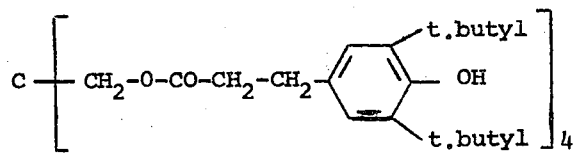

A process for rendering polyurethanes heat-resistant and resistant to oxidation has now been found, according to the present invention, which process comprises incorporating a hydroxylic spiro-bis-indane compound of the formula (I)

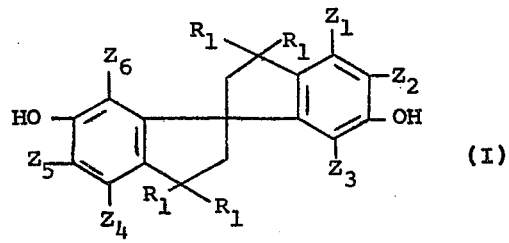

in which each of the $R_1$ radicals, which may be identical or different, represents a methyl or ethyl radical, and each of $Z_1$, $Z_2$, $Z_3$, $Z_4$, $Z_5$ and $Z_6$, which may be identical or different, represents a hydrogen atom, a hydroxyl group, an alkyl radical, an alkoxy radical or a halogen atom.

The hydroxylic spiro-bis-indane compounds of formula (I) result from the condensation of a ketone and phenolic compounds. These compounds are described in the literature in the following publications: J. Chem. Soc. 415 (R. F. CURTIS) 1962, J. Chem. Soc. 1,678 (W. BAKER) 1934, Chemical Abstracts 27, 1873 (SU-KÖDS) 1933, J. Chem. Soc. 1,421 (W. BAKER) 1939, J. Chem. Soc. 195 (W. BAKER) 1939, Tetrahedron letters 34, 3,707 (J. POSPISIL) 1968 and U.S. Pat. No. 3,126,380.

Amongst the compounds of the formula (I) those in which the radicals $Z_1$, $Z_2$, $Z_3$, $Z_4$, $Z_5$ and $Z_6$ have the following meanings: a hydrogen atom, a hydroxyl group, a straight or branched alkyl radical with up to 4 carbon atoms, an alkoxy radical with 1 to 4 carbon atoms, a chlorine atom or a bromine atom, are preferred.

The 1,1'-spiro-bis-indane derivatives which possess at least two hydroxyl groups on each benzene ring and, optionally, additional hydroxyl groups or alkyl or alkoxy groups or chlorine or bromine atoms are particularly suitable.

By way of illustration, the following compounds may be mentioned:

6,6'-dihydroxy-3,3,3',3'-tetramethyl-1,1'-spiro-bis-indane,
6,6'-dihydroxy-3,3,3',3'-tetraethyl-1,1'-spiro-bis-indane,
6,6'-dihydroxy-3,3,3',3',5,5'-Hexamethyl-1,1'-spiro-bis-indane,
6,6'-dihydroxy-5,5'-dimethoxy-3,3'-diethyl-2,3,3'-trimethyl-1,1'-spiro-bis-indane,
5,5',6,6'-tetrahydroxy-3,3,3',3'-tetramethyl-1,1'-spiro-bis-indane,
5,5',6,6'-tetrahydroxy-3,3,3',3'-tetraethyl-1,1'-spiro-bis-indane,
5,5',6,6'-tetrahydroxy-3,3,'-diethyl-2,3,3'-trimethyl-1,1'-spiro-bis-indane,
5,5',6,6'-tetrahydroxy-3,3,3',3'-tetraethyl-2,2'-dimethyl-1,1'-spiro-bis-indane,
6,6',7,7'-tetrahydroxy-3,3,3',3'-tetramethyl-5,5'-di-(tertiary butyl)-1,1'-spiro-bis-indane,
5,5',6,6',7,7'-hexahydroxy-3,3,3',3'-tetramethyl-1,1'-spiro-bis-indane,
5,5',6,6'-tetrahydroxy-3,3,3',3'-tetramethyl-4,4',7,7'-tetrabromo-1,1'-spiro-bis-indane and
5,5',6,6'-tetrahydroxy-3,3,3',3'-tetramethyl-4,4',7,7'-tetrachloro-1,1'-spiro-bis-indane.

Particularly preferred are 5,5',6,6'tetrahydroxy-3,3,3',3'-tetramethyl-1,1'-spiro-bis-indane, which can be obtained in excellent yields from pyrocatechol and acetone [see R. F. Curtis, J. Chem. Soc. 415 (1962)], and 5,5',6,6'-tetrahydroxy-3,3,3',3'-tetramethyl-4,4',7,7'-tetrabromo-1,1'-spiro-bis-indane and its tetrachloro homologue, both of which are described in U.S. Pat. No. 3,126,380.

The stabilisers used in the present invention exert their beneficial effect on any type of polyurethane, no matter what it is to be used for.

The reactants for producing polyurethanes which can be rendered heat-resistant by means of the compounds of formula (I) can be selected, depending on the application envisaged, from the known polyisocyanates and the polyols. It is thus possible to use any simple aromatic, aliphatic or cycloaliphatic polyisocyanate possessing 2 or more —NCO groups, such as hexamethylene diisocyanate, butylene diisocyanate, toluylene 2,4- or 2,6-diisocyanate, p-phenylene diisocyanate, cyclohexylene 1,4-diisocyanate, 4,4'-bis-isocyanato-dicylohexylmethane, 4,4'-bis-isocyanato-diphenyl ether and polyarylene polyisocyanates which possess more than 2 functional groups and which are prepared from aniline/formaldehyde condensation products. It is also possible to employ modified polyisocyanates prepared by reacting a diisocyanate, present in excess, with a polyol of low molecular weight such as glycerol or trimethylolpropane. It is also possible to use a polyurethane prepolymer possessing terminal isocyanate groups prepared beforehand by reacting an excess of polyisocyanate with a polyol. It is also possible, in some cases, to add small amounts of a monoisocyanate.

It is possible to employ any type of polyol, the use of which is well known to those skilled in the polyurethane art. The polyols can be linear or branched and can possess 2 or more —OH groups. The choice of polyol is obviously a function of the desired use of the polyurethane. Thus, in order to prepare elastomeric products or flexible foams, linear long-chain polyols or polyols with only a low degree of branching, that is to say polyols with relatively long chains between hydroxyl groups are suitably used. When it is desired to prepare hard moulded products or rigid foams, highly branched polyols of relatively low molecular weight are generally used. Intermediate these extremes, semi-rigid foams or semi-flexible foams can be obtained depending on the molecular weight or on the degree of branching of the polyol. It is also possible to modify the properties of the products by adding small amounts of a monofunctional hydroxylic compound.

Suitable polyols include polyhydroxylic polyethers such as simple polyalkylene glycols like diethylene glycol, dipropylene glycol and polyethylene glycols and polypropylene glycols and copolymers of ethylene glycol or propylene glycol. It is also possible to use polyhydroxylic polyethers prepared by adding alkylene oxides to simple polyfunctional compounds possessing hydroxyl, amino and carboxylic acid groups, such as ethylene glycol, propylene glycol, glycerol, trimethylolpropane, hexane-1,2,6-triol, butanediol, sucrose, glucose, sorbitol, pentaerythritol, mannitol, dulcitol, triethanolamine, N-methyldimethanolamine, tartaric acid, malic acid and ricinoleic acid. It is also possible to employ polythioethers such as those prepared from thioglycol.

Polyhydroxylic polyesters are polyols which are much used. They can be prepared by reacting one or more polycarboxylic acids with a suitable molar excess of one or more simple polyols. Amongst the polyacids, there may be mentioned aliphatic acids such as succinic acid, glutaric acid, adipic acid, pimelic acid, suberic acid and sebacic acid, cycloaliphatic acids such as cyclohexane-1,4-dicarboxylic acid, and aromatic acids such as ortho-, meta- and para-phthalic acids. As examples of polyols which may be used, there may be mentioned ethane-1,2-diol, propane-1,2- and -1,3-diols, butane-1,2-, -1,3- and -1,4-diols, hexane-1,6-diol, decane-1,10-diol, glycerol, hexane-1,2,6-triol, trimethylolpropane and pentaerythritol.

It is also possible to use $\alpha,\omega$-dihydroxylic polyesteramides, $\alpha,\omega$-dihydroxylic polyurethanes and $\alpha,\omega$-dihydroxylic hydrocarbons such as $\alpha,\omega$-dihydroxylic polybutadienes or butadiene/isobutylene copolymers; it is also possible to use optionally modified castor oil and the products resulting from the etherification of silanols or siloxanes by means of polyhydroxylic polyethers or polyhydroxylic polyesters.

The relative weight proportions of the polyol and the polyisocyanate are not critical. They depend on the application envisaged. The ratio is usually approximately 1 and it is possible to prepare polyurethanes in which the terminal groups can be isocyanate groups or hydroxyl groups. When a prepolymer is prepared, the ratio of the number of isocyanate groups to the number of hydroxyl groups is generally greater than 1, suitably from 1.05 to 3.

The stabilisers are generally introduced in an amount from 0.1 to 10%, preferably 0.2 to 5%, by weight relative to the weight of dry polymer. The stabiliser can be introduced at the same time as the reagents for the urethanisation reaction or after this reaction is complete. The stabiliser is generally mixed homogeneously with the polyol. Concentrated solutions of stabilisers in ketones such as acetone or in polar solvents such as dimethylformamide are advantageously employed. Such a solvent, which makes it possible to introduce the stabiliser homogeneously, can optionally be removed thereafter.

The stabilisers used in the present invention are compatible with the catalysts for the urethanisation reaction, such as those described in, for example, J. H. SAUNDERS and K. C. FRISCH: Polyurethane Chemistry and Technology, part I, Chemistry. Amongst the catalysts which may be used, there may be mentioned tertiary amines, heavy metal derivatives, acids and acid chlorides. Depending on the application envisaged, it can be desirable to introduce, in addition to the essential constitutents mentioned above, various additives such as agents for imparting resistance to combustion and to ultra-violet radiation, surface-active agents, pore-forming agents, dyestuffs, pigments and fillers. Generally these various additives are compatible with the hydroxylic-spiro-bis-indane compounds of formula (I).

The polyurethanes stabilised according to the process of this invention can be exposed for long periods (for example several hundred hours) to temperatures above 100°C without observing any substantial deterioration in their mechanical properties. Such a property can advantageously be exploited in the preparation of articles by coating as in, for example, car fittings, as well as in the preparation of foams. The following Examples further illustrate the present invention.

EXAMPLE 1

A polyurethane prepolymer possessing terminal isocyanate groups is prepared by heating a mixture consisting of 1,000 g of 4,4'-diisocyanato-diphenylmethane and 2,000 g of an $\alpha,\omega$-dihydroxylic polyester [polyadipate of hexane-1,6-diol and ethylene glycol, 66/34; molecular weight: 2,000] for 1 hour at 100°C.

The polyurethane prepolymer is dissolved in 3,050 g of methyl ethyl ketone and another solution containing 270 g of butane-1,4-diol, 3,050 g of dimethylformamide and 3 g of dibutyl-tin dilaurate is run into the above solution. A 35% strength polyurethane solution is thus obtained to which a stabiliser is sometimes added in an amount of 1% by weight relative to the weight of the polymer. Thin films (5/100 mm) are prepared from this solution, in accordance with the usual techniques. These films are placed in a ventilated oven at 120°C, and degradation is followed by measuring the load at break (initial value 475 kg/cm$^2$). The results are given in the Table which follows.

|  | Variations in the load at break as a % of the initial value for periods of exposure of: | | | | | |
| --- | --- | --- | --- | --- | --- | --- |
|  | 0 hrs. | 32 hrs. | 58 hrs. | 82 hrs. | 108 hrs. | 136 hrs. |
| Without a stabiliser | 0 | −15 | −41 |  | −58 | −63.4 |
| Stabiliser A* | 0 | −1.5 | −4.5 | −5.4 | −6 | −12 |
| Stabiliser B** | 0 | −6 | −35.3 | −52.4 | −54.4 | −63.4 |

*Stabiliser A: 5,5',6,6'-tetrahydroxy-3,3,3',3'-tetramethyl-1,1'-spiro-bis-indane
**Stabiliser B:

$$C\left[-CH_2-O-CO-CH_2-CH_2-\underset{\diagdown t.butyl}{\overset{\diagup t.butyl}{\bigcirc}}-OH\right]_4$$

It can be seen from the Table that the mechanical properties of the polyurethane stabilised according to the process of this invention have not decreased substantially after 100 hours of exposure at 100°C.

EXAMPLE 2

A polyester-urethane solution is prepared by heating a mixture consisting of:

| | |
|---|---:|
| 4,4'-diisocyanato-diphenylmethane | 1,000 g |
| α,ω-dihydroxylic polyester | 2,000 g |
| [The polyester is a polyadipate of hexane-1,6-diol and ethylene glycol; molar ratio of hexanediol to ethylene glycol: 66/34; molecular weight: 2,000.] | |
| butane-1,4-diol | 270 g |
| dibutyl-tin dilaurate | 3 g |
| dimethylformamide | 6,100 g |
| for 2 hours 30 minutes at 80°C. | |

A spiro-bis-indane stabiliser is added to this polyester-urethane solution in an amount of 1% by weight relative to the weight of polymer, and thin films (thickness 5/100 mm) are prepared in accordance with the usual techniques. These films are placed in a ventilated oven at 120°C. The variation in the value of the load at break (initial value: 525 kg/cm$^2$) is measured after heating for 96 hours. The results are given in the Table which follows:

EXAMPLE 3

A polyether-urethane prepolymer possessing terminal isocyanate groups is prepared by heating a mixture consisting of:

| | |
|---|---:|
| 4,4'-diisocyanato-diphenylmethane: | 1,035 g |
| α,ω-dihydroxylic polyether: | 2,700 g |
| (polypropylene glycol; molecular weight 1,800) | |
| trimethylolpropane: | 20.1 g |
| for 1 hour at 100°C. | |

The polyurethane prepolymer is dissolved in 3,250 g of methyl ethyl ketone, and this solution is run into another solution containing 150 g of ethylene glycol, 3,250 g of dimethylformamide and 3.7 g of dibutyltin dilaurate.

A spiro-bis-indane stabiliser is added to the polyether-urethane solution in an amount of 1% by weight relative to the weight of the polymer, and thin films (5/100 mm) are prepared in accordance with the usual techniques. These films are placed in a ventilated oven at 120°C and the variation in the value of the load at break (initial value 115 kg/cm$^2$) is measured after heating for 96 hours. The results are given in the Table which follows:

EXAMPLE NO. 3

| Nature of the stabiliser | Variations in the load at break as a % of the initial value for 96 hrs. of exposure |
|---|---|
| Control experiment, no stabiliser | −60.1 |
| 5,5',6,6'-tetrahydroxy-3,3,3',3'-tetramethyl-1,1'-spiro-bis indane | + 8.3 |
| 5,5',6,6'-tetrahydroxy-3,3'-dimethyl-3,3'-diethyl-1,1'-spiro-bis-indane | −22.4 |
| 5,5',6,6'-tetrahydroxy-3,3,3',3'-tetramethyl-4,4',7,7'-tetrabromo-1,1'-spiro-bis-indane | − 2.7 |
| 5,5',6,6',7,7'-hexahydroxy-3,3,3',3'-tetramethyl-1,1'-spiro-bis-indane | − 0.5 |

EXAMPLE NO. 2.

| Nature of the stabiliser | Variations in the load at break as a % of the initial value for 96 hrs. of exposure |
|---|---|
| Control experiment, no stabiliser | −41.5 |
| 5,5',6,6'-tetrahydroxy-3,3,3',3'-tetramethyl-1,1'-spiro-bis-indane | + 1.6 |
| 5,5',6,6'-tetrahydroxy-3,3'-dimethyl-3,3'-diethyl-1,1'-spiro-bis-indane | + 4.9 |
| 5,5',6,6'-tetrahydroxy-3,3,3',3'-tetramethyl-4,4',7,7'-tetrabromo-1,1'-spiro-bis-indane | + 2.5 |
| 6,6'-dihydroxy-3,3,3',3'5,5'-hexamethyl-1,1'-spiro-bis-indane | −35.1 |
| 6,6'-dihydroxy-3,3,3',3'-tetramethyl-1,1'-spiro-bis indane | −37.1 |
| 6,6'-dihydroxy-3,3,3',3'-tetramethyl-5,5'-dimethoxy-1,1'-spiro-bis-indane | −36.3 |
| 5,5',6,6',7,7'-hexahydroxy-3,3,3',3'-tetramethyl-1,1'-spiro-bis-indane | −25.8 |

I claim:
1. A polyurethane composition which comprises, as stabiliser, a hydroxylic spiro-bis-indane compound of the formula:

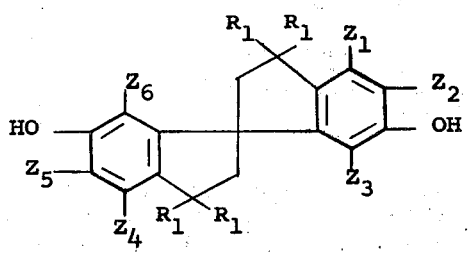

in which each of the $R_1$ radicals which may be identical or different; represents a methyl or ethyl radical, and each of $Z_1$, $Z_2$, $Z_3$, $Z_4$, $Z_5$ and $Z_6$, which may be identical or different; represents a hydrogen atom, a hydroxyl group, an alkyl radical, an alkoxy radical or a halogen atom, said compound possessing at least two hydroxyl groups on each benzene ring.

2. A composition according to claim 1, in which at least one of $Z_1$, $Z_2$, $Z_3$, $Z_4$, $Z_5$ and $Z_6$ represents a hydrogen atom, a hydroxyl group, a straight or branched alkyl radical with up to 4 carbon atoms, an alkoxy radical with 1 to 4 carbon atoms, a chlorine atom or a bromine atom.

3. A composition according to claim 1, in which the hydroxylic spiro-bis-indane is 5,5',6,6'-tetrahydroxy-3,3,3',3'-tetramethyl-1,1'-spiro-bis-indane.

4. A composition according to claim 1, in which the hydroxylic spiro-bis-indane is 5,5',6,6'-tetrahydroxy-3,3,3',3'-tetramethyl-4,4',7,7'-tetrabromo (or chloro)-1,1'-spiro-bis-indane.

5. A composition according to claim 1, in which the hydroxylic spiro-bis-indane derivative is present in an amount from 0.1 to 10% by weight relative to the weight of the dry polymer.

6. A composition according to claim 5, in which the hydroxylic spiro-bis-indane is present in an amount from 0.2 to 5% by weight relative to the dry weight of the polymer.

7. A composition according to claim 1, in which the polyurethane is one prepared from a polyhydroxylic polyester or a polyhydroxylic polyether.

8. Process for preparing a polyurethane composition as defined in claim 1 which comprises incorporating the hydroxylic spiro-bis-indane into the polyurethane or a polyurethane precursor.

9. Process according to claim 8, in which the bis-indane is introduced with the reagents for the polyurethane.

10. Process according to claim 9, in which the bis-indane is introduced as a homogeneous mixture with the polyol.

11. Process according to claim 8, in which the bis-indane is incorporated after the polyurethane has been produced.

* * * * *

UNITED STATES PATENT OFFICE
CERTIFICATE OF CORRECTION

Patent No. 3,945,968　　　　　　　Dated March 23, 1976

Inventor(s) Jean Goletto

It is certified that error appears in the above-identified patent and that said Letters Patent are hereby corrected as shown below:

In the heading:

Change the name of the assignee from "Rhone-Poulenc Textile" to --Rhone-Poulenc S.A.--

Signed and Sealed this

Fourth Day of January 1977

[SEAL]

Attest:

RUTH C. MASON
*Attesting Officer*

C. MARSHALL DANN
*Commissioner of Patents and Trademarks*